United States Patent [19]
Johnson

[11] Patent Number: 5,128,971
[45] Date of Patent: Jul. 7, 1992

[54] FREQUENCY SYNCHRONIZATION APPARATUS

[75] Inventor: Mark J. Johnson, Algonquin, Ill.

[73] Assignee: Motorola, Inc., Schaumburg, Ill.

[21] Appl. No.: 640,677

[22] Filed: Jan. 14, 1991

[51] Int. Cl.$^5$ .............................................. H04L 7/00
[52] U.S. Cl. ...................................... 375/107; 370/48; 455/51.1
[58] Field of Search ............... 375/106, 107, 108, 117; 370/48, 103; 455/51, 75

[56] References Cited

U.S. PATENT DOCUMENTS

| | | | |
|---|---|---|---|
| 3,388,216 | 6/1968 | Brooke et al. ...................... | 375/117 |
| 3,430,204 | 2/1969 | Milford ............................... | 375/117 |
| 4,792,966 | 12/1988 | Ballweg .............................. | 370/102 |
| 4,852,128 | 7/1989 | Lill ...................................... | 370/48 |

*Primary Examiner*—Stephen Chin
*Attorney, Agent, or Firm*—Wayne J. Egan

[57] ABSTRACT

An improved method and apparatus for synchronizing a receiver oscillator with a transmitter oscillator is provided. The receiver is arranged with a counter driven by the receiver oscillator; and the transmitter is arranged with a counter driven by the transmitter oscillator. The transmitter sends a start signal to the receiver and simultaneously records the current reading of its counter. Later, the transmitter sends a stop signal to the receiver and simultaneously records the current reading of its counter. The transmitter then computes the elapsed count, and sends this value to the receiver as the "transmitter reading". Upon receipt of the start signal, the receiver records the current reading of its counter. Later, upon receipt of the stop signal, the receiver records the current reading of its counter, and then computes the elapsed count. Upon receipt of the "transmitter reading", the receiver is then able to determine the error of its own oscillator relative to that of the transmitter site oscillator as:

$$\frac{A \times \text{receiver reading} - B \times \text{transmitter reading}}{B \times \text{transmitter reading}},$$

where A and B are predetermined constants which may be used to normalize the receiver and transmitter counter speeds to each other or to a third set of units. The transmitter then warps its own oscillator based on the calculated error. In an alternate embodiment, the transmitter resets its counter to zero upon sending the first start signal; and the receiver resets its counter to zero upon receipt of this signal.

26 Claims, 1 Drawing Sheet

FREQUENCY SYNCHRONIZATION APPARATUS

TECHNICAL FIELD

This application relates to a method and apparatus for synchronizing oscillators in radio sites with a master oscillator located in the fixed radio equipment.

BACKGROUND OF THE INVENTION

In a simulcast network, exact frequency synchronization of the various transmitters is required. This requirement often exceeds even the capabilities of ultra high-stability temperature-regulated reference oscillators commonly used in such applications. To maintain the required degree of synchronization, periodic manual measurement and adjustment is required.

SUMMARY OF THE INVENTION

It is an object of the invention to provide an improve method and apparatus for synchronizing a receiver oscillator with a transmitter oscillator. The receiver is arranged with a counter driven by the receiver oscillator; and the transmitter is arranged with a counter driven by the transmitter oscillator.

According to the invention, the transmitter sends a start signal to the receiver and simultaneously records the current reading of its counter. Some time later, the transmitter sends a stop signal to the receiver and simultaneously records the current reading of its counter. The transmitter then computes the elapsed count (difference between its counter readings), and sends this value to the receiver as the "transmitter reading". As for the receiver, upon receipt of the start signal, it simultaneously records the current reading of its counter. Later, upon receipt of the stop signal, the receiver records the current reading of its counter, and then computes the elapsed count (difference between its counter readings) and used this value as the "receiver reading". Upon receipt of the "transmitter reading", the receiver is then able to determine the error of its own oscillator relative to that of the transmitter site 101 oscillator 109 as:

$$\frac{A^x \text{ receiver reading} - B^x \text{ transmitter reading}}{B^x \text{ transmitter reading}}$$

where the constants A and B may be used to normalize the receiver and transmitter counter speeds to each other or to a third set of units. The receiver then warps its own oscillator based on the calculated error.

In an alternate embodiment, the transmitter resets its counter to zero upon sending the first start signal; and the receiver resets its counter to zero upon receipt of this signal.

DETAILED DESCRIPTION OF THE INVENTION

Figure 1:
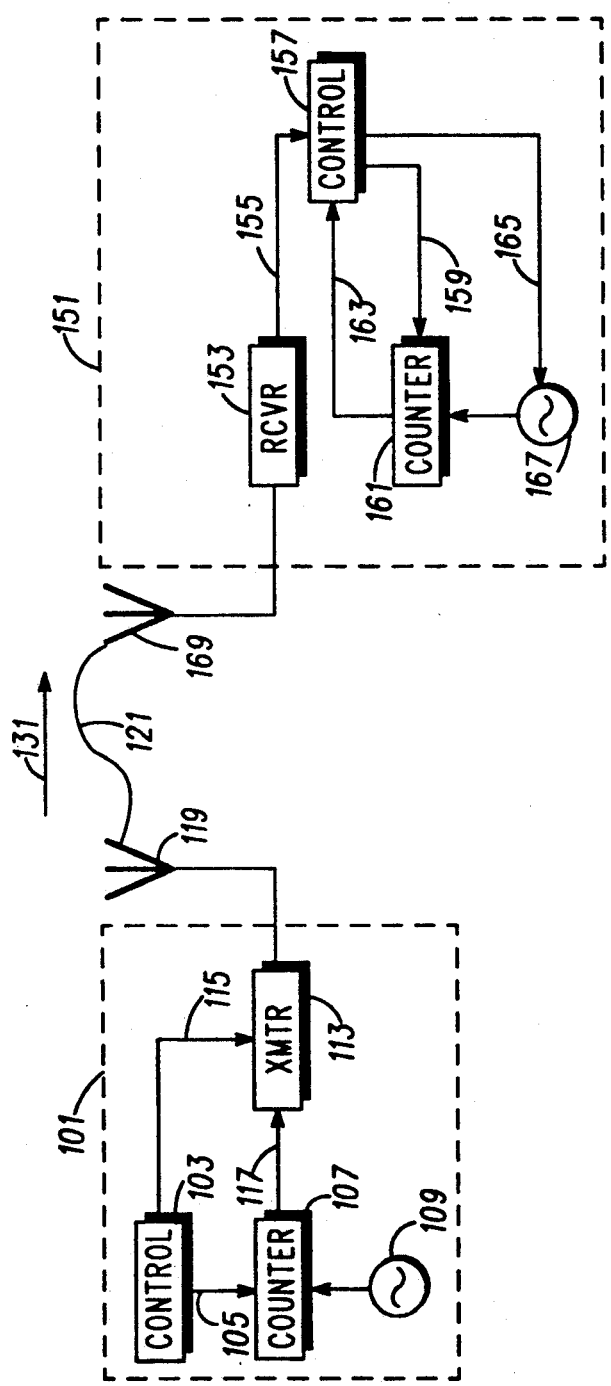
FIG. 1 is a block diagram that shows a first embodiment of a frequency synchronization apparatus, according to the invention.

Referring now to FIG. 1, there is shown a receiver site 151 arranged to receive signals 131 from a transmitter site 101 by means of a channel 121. The channel 121 may be, for instance, a radio communications link.

Referring now to the transmitter site 101, there is shown a first oscillator 109 coupled to a first counter 107. There is also shown a controller 103. The first controller 103 may comprise, for instance, a suitably-programmed computer, microprocessor, or Digital Signal Processor (DSP). The controller 103 is arranged to control the counter 107 by means of control path 105. Such control will include issuing the typical START, STOP, SET and RESET commands. Also as shown, the counter 107 is coupled to transmitter 113 which, in turn, is arranged to apply signals 131 to the channel 121 via an antenna 119.

Referring now to the receiver site 151, there is shown a second oscillator 167 coupled to a second counter 161. There is also shown an antenna 169 couped to a receiver 153 which, in turn, is coupled to a second controller 157 via path 155. The controller 157 may comprise, for instance, a suitably-programmed computer, microprocessor, or Digital Signal Processor (DSP). The controller 157 is arranged to control the counter 161 by means of a control path 159. Such control will include issuing the typical START, STOP, SET and RESET commands.

Those skilled in the art will appreciate that the goal of the invention is to equalize the oscillator 167 in the satellite site 151—and the oscillators in all similar receiver sites—to the same frequency as the oscillator 109 in the controller site 101. It will be appreciated that the controller site 101 has outbound signal paths to all receiver sites 151 in the system, which may carry control traffic in the form of packetized messages. A typical protocol for this purpose might be, for instance, the MDC—1200 protocol.

To start the synchronization operation, the transmitter site controller 103 causes the transmitter 113 to send a special "start synchronization" signal to the receiver site 151 via channel 121. At the same time, controller 103 causes the counter 107 to reset to zero, and then to begin counting responsive to oscillator 109. It will be appreciated that this first ("start") signal may, for instance, be imbedded into a first message packet.

At the receiver site 151, the receiver 153 couples the special "start synchronization" signal to the controller 157 via path 155. Upon receipt of the signal, controller 157 causes the counter 161 to reset to zero, and then to begin counting responsive to oscillator 167.

Some time later the transmitter site controller 103 causes the transmitter 113 to send a special "stop synchronization" signal to the receiver site 151 via channel 121. At the same time, controller 103 causes the counter 107 to stop counting, storing the count value at this time. It will be appreciated that this second ("stop") signal may, for instance, be imbedded into a second message packet. The transmitter reading is then coupled to transmitter 113 via path 117, and sent to the receiver site 151 via channel 121. It will be appreciated that the transmitter reading may be encoded and imbedded into the same (second) message packet that contains the "stop" signal or, in the alternative, the transmitter reading may be encoded and imbedded into another (third) message packet.

At the receiver site 151, the receiver 153 couples the special "stop synchronization" signal to the controller 157 via path 155. Upon receipt of the signal, controller 157 causes the counter 161 to stop counting. The receiver reading is then coupled to controller 157 via path 163. Upon receipt, the receiver 153 also decodes the transmitter readings and couples this information to the controller 157.

The controller 157 then computes the error of its own oscillator 167 relative to that of the transmitter site 101 oscillator 109 as:

$$\frac{A \times \text{receiver reading} - B \times \text{transmitter reading}}{B \times \text{transmitter reading}},$$

where the constants A and B may be used to normalize the receiver and transmitter counter speeds to each other or to a third set of units, and it may then warp its own oscillator 167 via path 165 to correct it. Thus, if the transmitter reading is greater than the receiver reading, then the controller 157 will increase the frequency of oscillator 167 by the amount of the error. Otherwise, if the transmitter reading is less than the receiver reading, then the controller 157 will decrease the frequency of oscillator 167 by a like amount.

One skilled in the art will appreciate that, as an alternate embodiment, the transmitter 101 could, at the time it sends the first "start synchronization signal" to the receiver 151, be arranged to save the corresponding reading of counter 107, instead of resetting counter 107 to zero at this point. Also with this embodiment, upon sending the second "stop synchronization signal" to the receiver 151, the transmitter 101 could be arranged to compute the elapsed count corresponding to the difference between the two readings of counter 107, and to send this transmitter counter elapsed reading value to the receiver 151 as the "transmitter reading" to be used by the receiver 151 in computing the error of its own oscillator 167 relative to that of the transmitter site 101 oscillator 109.

Also with this alternate embodiment, receiver 151 could, at the time it receives the first "start synchronization signal" from the transmitter 101, be arranged to save the corresponding reading of counter 161, instead of resetting counter 161 to zero at this point. Also with this embodiment, upon receiving the second "stop synchronization signal" from the transmitter 101, the receiver 151 could be arranged to compute the elapsed count corresponding to the difference between the two readings of counter 161, and to utilize this receiver counter elapsed reading value as the "receiver reading" in computing the error of its own oscillator 167 relative to that of the transmitter site 101 oscillator 109.

When applied in a radio communication system, the invention provides for a simple method of allowing the base station to equalize itself based on commands from the controller, without necessitating the return path for station status back to the controller. Further, it takes some of the load off of the controller and reduces traffic on all control paths. As the method does not tie up the channel for a substantial amount of time, as prior art methods do, the user perceives a performance improvement. Furthermore, since continuous equalization is possible, less expensive, lower stability oscillators can be used. The invention thus makes up for the lower stability with constant readjustment.

Since this method does not tie up the outbound channel, several stations may be equalized simultaneously. It is obvious that the accuracy that can be obtained is limited only by the resolution of the counter and the duration of the operation. Since the operation is non-obtrusive, and the count is contained in the second packet message, the synchronization may take an arbitrarily long and flexible amount of time, allowing for frequency synchronization well within the most demanding requirements.

One skilled in the art will appreciate that the frequency synchronization apparatus and method, according to the present invention, provides a substantial advantage over the prior art. The closest technology is the present manual synchronization system. In this system, a service man visits each site and zero beats each transmitter's carrier frequency with that of another transmitter in the overlap area. This is accomplished by using the site transmit antenna to receive the unmodulated RF from the keyed remote transmitter. This signal is mixed with a low level output from the on-site transmitter, and the service man tunes the on-site reference for zero beat note. Both transmitters are removed from the system during the equalization. This process must be repeated for all transmitters in the system.

Referring to FIG. 1, it will be apparent to those skilled in the art that the transmitter 101 may substantially comprise a suitably-programmed Digit Signal Processor (DSP). Likewise, the receiver 151 may substantially comprise a suitably-programmed DSP.

An example of the use of the synchronization formula is as follows: The synchronization formula is:

$$\frac{A^x \text{ receiver reading} - B^x \text{ transmitter reading}}{B^x \text{ transmitter reading}}$$

where A and B are correction factors which may normalize the receive or transmit count frequencies to the other or to a third system of units. Assume, for example, that the transmitter has a 16.8 MHz reference oscillator and that the receiver has a 14.4 MHz reference oscillator. Assume further that the units chosen for reference are tenths of microseconds. Therefore, the receiver reading must be multiplied by 10/14.4, or 0.694444, in order to normalize its reading to tenths of microseconds. Similarly, the transmitter reading must be normalized to 10/16.8, or 0.595238. The formula becomes:

$$\frac{0.694444^x \text{ receiver reading} - 0.595238^x \text{ transmitter reading}}{0.595238^x \text{ transmitter reading}}$$

It is obvious that this can be algebraically reduced to $$1.1666667^x \frac{\text{receiver reading}}{\text{transmitter reading}} - 1$$

in order to simplify computation and eliminate the need for the third system of units.

While various embodiments of a frequency synchronization apparatus, according to the present invention, have been described hereinabove, the scope of the invention is defined by the following claims.

What is claimed is:

1. In a communications system comprising a transmitter having a transmitter oscillator and a counter responsive to said transmitter oscillator, and a receiver having a receiver oscillator and a counter responsive to said receiver oscillator, said transmitter coupled to said receiver by a channel, a method for adjusting said receiver oscillator, comprising the steps of:

at said transmitter:
(a) sending a first signal to said receiver and determining the time at which the signal is sent based on the value of the transmitter counter;
(b) thereafter, sending a second signal to said receiver and determining the time at which the signal is sent based on the value of the transmitter counter;

(c) computing the transmitter elapsed time corresponding to the difference between the reading in (a) and the reading in (b);

(d) sending a third signal with said transmitter elapsed time encoded therein to said receiver;

at said receiver:

(e) receiving said first signal and determining the time at which the signal is received based on the value of the receiver counter;

(f) receiving said second signal and determining the time at which the signal is received based on the value of the receiver counter;

(g) computing the receiver elapsed time based on the difference betwen the reading in (e) and the reading in (f);

(h) receiving and decoding said third signal to provide said transmitter elapsed time;

(i) computing an error based on the absolute or relative difference between the receiver elapsed time and the transmitter elapsed time;

(j) increasing the frequency of the receiver oscillator based on said error when the transmitter elapsed time is greater than said receiver elapsed time, otherwise decreasing the frequency of the receiver oscillator based on said error.

2. The method of claim 1 wherein said channel is a radio frequency communications link.

3. The method of claim 2 wherein said first signal comprises a first message packet, said second comprises a second message packet, and said third signal comprises a third message packet.

4. The method of claim 2 wherein said first signal comprises a first message packet, said second signal and said third signal comprise a second message packet.

5. In a communications system comprising a transmitter having a transmitter oscillator and a counter responsive to said transmitter oscillator, and a receiver having a receiver oscillator and a counter responsive to said receiver oscillator, said transmitter coupled to said receiver by a channel, a method for adjusting said receiver oscillator, comprising the steps of:

at said transmitter:

(a) sending a first signal to said receiver and, at substantially the same time, resetting the transmitter counter to zero;

(b) thereafter, sending a second signal to said receiver and, at substantially the same time, determining the transmitter elapsed time based on the corresponding reading of the transmitter counter;

(c) sending a third signal with said transmitter elapsed time encoded therein to said receiver;

at said receiver:

(d) receiving said first signal and, at substantially the same time, resetting the receiver counter to zero;

(e) receiving said second signal and, at substantially the same time, determining the receiver elapsed time based on the corresponding reading of the receiver counter;

(f) receiving and decoding said third signal to provide said transmitter elapsed time;

(g) computing an error based on the difference between the receiver elapsed time and the transmitter elapsed time (h) increasing the receiver oscillator frequency based on said error when the transmitter elapsed time is greater than said receiver elapsed time, otherwise decreasing the receiver oscillator based on said error.

6. The method of claim 5 wherein said channel is a radio frequency communications link.

7. The method of claim 6 wherein said first signal comprises a first message packet, said second signal comprises a second message packet, and said third signal comprises a third message packet.

8. The method of claim 6 wherein said first signal comprises a first message packet, said second signal and said third comprise a second message packet.

9. A communications system comprising a transmitter having a transmitter oscillator and a counter responsive to said transmitter oscillator, and a receiver having a receiver oscillator and a counter responsive to said receiver oscillator, said transmitter coupled to said receiver by a channel, the communications system arranged for adjusting said receiver oscillator, said transmitter comprising:

means for sending a first signal to said receiver and means for determining, at substantially the same time, the corresponding reading of the transmitter counter, thus forming a first transmitter counter reading;

means for thereafter sending a second signal to said receiver and means for determining, at substantially the same time, the corresponding reading of the transmitter counter, thus forming a second transmitter counter reading;

means for computing the transmitter elapsed count corresponding to the difference between the first transmitter counter reading and the second transmitter counter readings;

means for sending a third signal with said transmitter elapsed count encoded therein to said receiver;

said receiver comprising:

means for receiving said first signal and means for determining, at substantially the same time, the corresponding reading of the receiver counter, thus forming a first receiver counter reading;

means for receiving said second signal and means for determining at substantially the same time, the corresponding reading of the receiver counter, thus forming a second receiver counter reading;

means for computing the receiver elapsed count corresponding to the difference between the first receiver counter reading and the second receiver counter readings;

means for receiving and decoding said third signal to provide said transmitter elapsed count;

means for computing an error based on:

$$\frac{AX \text{ receiver elapsed count} - BX \text{ transmitter elapsed count}}{BX \text{ transmitter elapsed count}},$$

where A and B are predetermined constants;

means for increasing the receiver oscillator based on said error when the transmitter elapsed count is greater than said receiver elapsed count, otherwise decreasing the receiver oscillator based on said error.

10. The communications system of claim 9 wherein said channel is a radio frequency communications link.

11. The communications system of claim 10, where A and B are used to normalize the receiver and transmitter counter speeds to each other or to a third set of units.

12. The communications system of claim 11 wherein said first signal comprises a first message packet, said second signal comprises a second message packet, and said third signal comprises a third message packet.

13. The communications system of claim 11 wherein said first signal comprises a first message packet, said second signal and said third signal comprise a second message packet.

14. A communications system comprising a transmitter having a transmitter oscillator and a counter responsive to said transmitter oscillator, and a receiver having a receiver oscillator and a counter responsive to said receiver oscillator, said transmitter coupled to said receiver by a channel, the communications system arranged for adjusting the receiver oscillator, said transmitter comprising:
 means for sending a first signal to said receiver and means for resetting, at substantially the same time, the transmitter counter to zero;
 means for thereafter sending a second signal to said receiver and means for determining, at substantially the same time, the transmitter elapsed count based on the corresponding reading of the transmitter counter;
 means for sending a third signal with said transmitter elapsed count encoded therein to said receiver;
at said receiver:
 means for receiving said first signal and means for resetting, at substantially the same time, the receiver counter to zero;
 means for receiving said second signal and means for determining, at substantially the same time, the receiver elapsed count based on the corresponding reading of the receiver counter;
 means for receiving and decoding said third signal to provide said transmitter elapsed count;
 means for computing an error based on $$\frac{AX \text{ receiver elapsed count} - BX \text{ transmitter elapsed count}}{BX \text{ transmitter elapsed count}},$$

where A and B are predetermined constants;
 means for increasing the receiver oscillator based on said error when the transmitter elapsed count is greater than said receiver elapsed count, otherwise decreasing the receiver oscillator based on said error.

15. The communications system of claim 14 wherein said channel is a radio frequency communications link.

16. The communications system of claim 15 where A and B are used to normalize the receiver and transmitter counter speeds to each other or to a third set of units.

17. The communications system of claim 16 wherein said first signal comprises a first message packet, said second signal comprises a second message packet, and said third signal comprises a third message packet.

18. The communications system of claim 16 wherein said first signal comprises a first message packet, said second signal and said third signal comprise a second message packet.

19. A radio arranged for receiving signals from a transmitter, the transmitter having a transmitter oscillator and a counter responsive to said transmitter oscillator, said transmitter arranged for:
 (a) sending a first signal to said radio via a radio frequency channel and, at substantially the same time, determining the corresponding reading of the transmitter counter;
 (b) thereafter, sending a second signal to said radio and, at substantially the same time, determining the corresponding reading of the transmitter counter;
 (c) computing the transmitter elapsed count corresponding to the difference between the reading in (a) and the reading in (b);
 (d) sending a third signal with said transmitter elapsed count encoded therein to said radio;
said radio comprising:
 a radio oscillator and a counter responsive to said radio oscillator; means for receiving signals from said transmitter via said radio frequency channel,
 means for receiving said first signal and, at substantially the same time, determining the corresponding reading of the radio counter;
 means for receiving said second signal and, at substantially the same time, determining the corresponding reading of the radio counter;
 means for computing the radio elapsed count corresponding to the difference between the first and second radio counter readings;
 means for receiving and decoding said third signal to provide said transmitter elapsed count;
 means for computing an error based on:

$$\frac{AX \text{ receiver elapsed count} - BX \text{ transmitter elapsed count}}{BX \text{ transmitter elapsed count}},$$

where A and B are predetermined constants;
 means for increasing the radio oscillator based on said error when the transmitter elapsed count is greater than said radio elapsed count, otherwise decreasing the radio oscillator based on said error.

20. the radio of claim 19 where A and B are used to normalize the radio and transmitter speeds to each other or to a third set of units.

21. The radio of claim 20 wherein said first signal comprises a first message packet, said second signal comprises a second message packet, and said third signal comprises a third message packet.

22. The radio of claim 20 wherein said first signal comprises a first message packet, said second signal and said third signal comprise a second message packet.

23. A radio arranged for receiving signals from a transmitter, the transmitter having a transmitter oscillator and a counter responsive to said transmitted oscillator, said transmitter arranged for:
 (a) sending a first signal to said radio via a radio frequency channel and, at substantially the same time, resetting the transmitter counter to zero;
 (b) thereafter, sending a second signal to said radio and, at substantially the same time, determining the corresponding reading of the transmitter counter;
 (c) computing the transmitter elapsed count based on the transmitter counter reading in (b);
 (d) sending a third signal with said transmitter elapsed count encoded therein to said radio;
said radio comprising:
 a radio oscillator and a counter responsive to said radio oscillator;
 means for receiving signals from said transmitter via said radio frequency channel,
 means for receiving said first signal and, at substantially the same time, resetting the radio counter to zero;
 means for receiving said second signal and, at substantially the same time, determining the corresponding reading of the radio counter;
 means for computing the radio elapsed count based on the determined radio counter reading;

means for receiving and decoding said third signal to provide said transmitter elapsed count;

means for computing an error based on:

$$\frac{AX \text{ receiver elapsed count} - BX \text{ transmitter elapsed count}}{BX \text{ transmitter elapsed count}},$$

where A and B are predetermined constants;

means for increasing the radio oscillator based on said error when the transmitter elapsed count is greater than said radio elapsed count, otherwise decreasing the radio osciallator based on said error.

24. The radio of claim 23 where A and B are used to normalize the radio and transmitter counter speeds to each other or to a third set of units.

25. The radio of claim 24 wherein said first signal comprises a first message packet, said second signal comprises a second message packet, and said third signal comprises a third message packet.

26. The radio of claim 24 wherein said first signal comprises a first message packet, said second signal and said third signal comprise a second message packet.

* * * * *

UNITED STATES PATENT AND TRADEMARK OFFICE
CERTIFICATE OF CORRECTION

PATENT NO. : 5,128,971
DATED : July 7, 1992
INVENTOR(S) : Mark J. Johnson

It is certified that error appears in the above-identified patent and that said Letters Patent is hereby corrected as shown below:

Column 8, line 24, "receiver" should be --radio--.

Column 9, line 7, "receiver" should be --radio--.

Signed and Sealed this

Seventh Day of September, 1993

Attest:

BRUCE LEHMAN

Attesting Officer        Commissioner of Patents and Trademarks